United States Patent
Moessner

(10) Patent No.: US 8,109,136 B2
(45) Date of Patent: Feb. 7, 2012

(54) SENSOR FOR RECOGNIZING A POSITION WHEN STARTING AN INTERNAL COMBUSTION ENGINE

(75) Inventor: David Moessner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 559 days.

(21) Appl. No.: 11/921,397

(22) PCT Filed: Apr. 21, 2006

(86) PCT No.: PCT/EP2006/061728
§ 371 (c)(1),
(2), (4) Date: May 28, 2009

(87) PCT Pub. No.: WO2006/133985
PCT Pub. Date: Dec. 21, 2006

(65) Prior Publication Data
US 2009/0301179 A1 Dec. 10, 2009

(30) Foreign Application Priority Data
Jun. 15, 2005 (DE) .......... 10 2005 027 654

(51) Int. Cl.
*G01M 15/06* (2006.01)
(52) U.S. Cl. .......... 73/114.26
(58) Field of Classification Search ........ 73/114.26
See application file for complete search history.

(56) References Cited

U.S. PATENT DOCUMENTS

| | | | |
|---|---|---|---|
| 5,036,730 A * | 8/1991 | Sakai et al. .......... 701/57 |
| 5,151,695 A | 9/1992 | Rollwitz et al. |
| 5,199,394 A | 4/1993 | Hartmann et al. |
| 5,447,143 A | 9/1995 | Ott et al. |
| 5,736,937 A * | 4/1998 | McGirr et al. .......... 340/870.16 |
| 5,749,060 A | 5/1998 | Graf et al. |
| 5,823,166 A * | 10/1998 | Entenmann et al. ..... 123/406.58 |
| 6,305,353 B1 * | 10/2001 | Weber et al. .......... 123/406.58 |
| 6,591,671 B2 * | 7/2003 | Brown .......... 73/146.5 |
| 6,839,621 B2 * | 1/2005 | Kaneko .......... 701/112 |
| 6,988,031 B2 * | 1/2006 | McDonald et al. .......... 701/112 |
| 7,049,948 B2 | 5/2006 | Yagi et al. |
| 2009/0301179 A1 | 12/2009 | Moessner |

FOREIGN PATENT DOCUMENTS

| | | |
|---|---|---|
| DE | 4 039 062 | 6/1992 |
| DE | 4 230 616 | 3/1994 |
| DE | 4 334 595 | 4/1995 |

(Continued)

OTHER PUBLICATIONS

International Search Report, Published PCT Application No. WO 2006/133985 dated Dec. 21, 2006.

*Primary Examiner* — Freddie Kirkland, III
(74) *Attorney, Agent, or Firm* — Kenyon & Kenyon LLP

(57) ABSTRACT

In order to acquire the angular position of a shaft of an internal combustion engine of a motor vehicle, in particular a crankshaft or a camshaft, a shaft angle sensor and a shaft angle sensor system are proposed. The shaft angle sensor has a magnetic transducer element and a magnetic sensor element. Either the magnetic transducer element or the magnetic sensor element is capable of being connected fixedly to the shaft. The magnetic sensor element produces at least one angle signal that is transmitted wirelessly to a base station by a transmitter device.

13 Claims, 1 Drawing Sheet

FOREIGN PATENT DOCUMENTS

| | | |
|---|---|---|
| DE | 2 001 4181 | 11/2000 |
| DE | 10 2004 019 858 | 3/2005 |
| DE | 103 38 120 | 3/2005 |
| JP | 5-10799 | 1/1993 |
| JP | 7501378 | 2/1995 |
| JP | 2001-174207 | 6/2001 |
| JP | 2002-221530 | 8/2002 |
| JP | 2003-158651 | 5/2003 |
| WO | WO 95/10427 | 4/1995 |
| WO | WO 2006/133985 | 12/2006 |

\* cited by examiner

SENSOR FOR RECOGNIZING A POSITION WHEN STARTING AN INTERNAL COMBUSTION ENGINE

FIELD OF THE INVENTION

The present invention relates to a shaft angle sensor and a shaft angle sensor system for acquiring an angular position of a shaft of an internal combustion engine of a motor vehicle, in particular a crankshaft or a camshaft. Such sensors are used in particular when starting the internal combustion engine, preferably in order to reduce the emission of pollutants by the engine.

BACKGROUND INFORMATION

When internal combustion engines are started, generally the position of the shafts, in particular the crankshaft of the internal combustion engine, but also possibly the camshaft, is not known. Correspondingly, an efficient engine controlling of the internal combustion engine in a motor vehicle can usually begin only after a few rotations of the engine.

This deficit is one of the main causes of the fact that the emission of pollutants from the internal combustion engine is significantly higher during the starting than during later operating phases of the engine.

Conventionally, it has therefore usually been attempted to recognize the position of the crankshaft and/or camshaft during the process of starting up the internal combustion engine. This takes place for example via what are known as encoders, for example encoder wheels, which are provided with a number of teeth on their circumference. From determined gaps in these toothed edges, the position of the shaft can be recognized during starting. During the shutoff process, via a runout recognition the attempt can be made to continue to follow the position of the engine until it comes to a standstill. During standstill, in contrast, any change in the engine can no longer be detected.

Various types of sensors are available that are suitable for acquiring the angular position of a crankshaft and/or camshaft. For example, German Patent Application No. DE 103 38 120 A1 describes a magnetic multiple encoder that can be used in particular to measure the angular position of a crankshaft of a motor vehicle. The multiple encoder has a magnetic track having a strip-shaped magnetization with alternating polarity, and at least one marking segment for defining a reference position. The marking segment is fashioned in such a way that it comprises a center area that is not magnetized or is only weakly magnetized, as well as two strips that are magnetized with the same polarity and are situated on either side of the center area.

However, generally the conventional sensor systems have many disadvantages. In particular, one disadvantage is that many of these sensors cannot recognize the engine position immediately when the internal combustion engine is started, but rather only when particular markings (for example the marking segment described in German Patent Application No. DE 103 38 120 A1) pass a corresponding sensor.

In addition, conventional systems are often sensitive to the high thermal loads that can occur in internal combustion engines during operation. In addition, in many cases the sensor systems take up a very large amount of space, and require an expensive energy supply. Due to the limited space conditions in particular in the area of the cylinder heads of internal combustion engines, this increased space requirement of sensors of this type is in many cases not acceptable.

SUMMARY

According to an example embodiment of the present invention, a shaft angle sensor for acquiring an angular position of a shaft of an internal combustion engine of a motor vehicle, in particular a crankshaft or a camshaft, is proposed that avoids the disadvantages of the conventional systems. In addition, a shaft angle sensor system is proposed that has a shaft angle sensor according to the present invention and a base station. Preferably, the proposed shaft angle sensor and the shaft angle sensor system are used to acquire an angular position of a crankshaft; however, they can also be used to acquire an angular position of a camshaft.

The example shaft angle sensor includes a magnetic transducer element and a magnetic sensor element. In addition, the shaft angle sensor can have a housing, preferably a hermetically sealed housing, that prevents contamination from penetrating into the interior of the housing, which could have an adverse effect on the sensor system. The housing can for example be situated fixedly or so as to be capable of rotation on the crankshaft or camshaft, and can thus either rotate together with the shaft or can remain at rest during the rotation of the shaft. Various realizations are possible.

Either the magnetic transducer element or the magnetic sensor element is capable of being connected fixedly to the shaft. In particular, this means that one of the two elements is intended to rotate together with the shaft. The respective other element can for example be connected fixedly to the housing, if the housing does not rotate with the shaft. However, according to the present invention the respective other element is preferably connected to a self-orienting pendulum device. This self-orienting pendulum device according to an example embodiment of the present invention is mounted so as to be capable of rotation about an axis that is parallel to a shaft axis. The self-orienting pendulum device orients itself in particular when the internal combustion engine is at a standstill.

Working together with the magnetic transducer element, the magnetic sensor element produces at least one angle signal concerning an angular position of the shaft. According to the present invention, this angle signal is capable of being transmitted in wireless fashion by a transmitting device to a base station that is a component of the shaft angle sensor system, in addition to the shaft angle sensor.

The magnetic sensor element and the magnetic transducer element can be constructed in various ways. On the one hand, the magnetic transducer element can in turn have a segmented transducer wheel, as is the case for example in German Patent Application No. DE 103 38 120 A1. However, because segmented magnetic transducer elements of this type produce relatively complex magnetic fields that are suitable predominantly for acquiring rotational speeds, it is preferred if the magnetic transducer element has a magnetic dipole. In particular, the magnetic transducer element can be a simple magnetic dipole disk that is for example attached to the shaft.

As a sensor design, for example the Hall effect can be used. Alternatively, and preferably, however, magnetoresistive sensor effects are used. In sensor designs of this sort, conventionally, a resistance measurement is detected as a function of a magnetic field. In particular, here the direction of the magnetic field can also be detected; as a result, a simple magnetic dipole is also sufficient for such a measurement. For example, what is called the anisotropic magnetoresistive (AMR) effect can be used here. Alternatively, or in addition, what is known as the gigantic magnetoresistive (GMR) effect can also be used. Sensor designs of this sort are known to those skilled in the art from other technological areas.

According to an example embodiment of the present invention, the shaft angle sensor and the shaft angle sensor system are used for recognizing a position of the internal combustion engine during starting. Correspondingly, an angular position of the shaft must take place in particular while the internal combustion engine is at a standstill. The shaft angle sensor system can therefore preferably have a standstill recognition system that recognizes when the internal combustion engine is at a standstill. If a standstill is recognized, an angle signal can be transmitted wirelessly to the base station immediately or, optionally, after a determined temporal delay. Preferably, exactly one angle signal is transmitted, in order to avoid a superfluous transmission of data. Preferably, an angle signal is transmitted to the base station only in case of standstill.

The standstill recognition system according to an example embodiment of the present invention can for example be constructed in such a way that angle signals are acquired at predetermined temporal intervals. If successive angle signals differ by not more than a predetermined tolerance angle, the standstill recognition system automatically detects a standstill.

The above-described self-orienting pendulum device according to the present invention preferably has a pendulum bob. For example, this pendulum bob can be constructed as an overlong pendulum arm that automatically rotates the pendulum device into the vertical position. This orientation can take place already during the operation of the internal combustion engine, or can take place only when the motor is running out after being switched off. In a preferred construction of the pendulum device, the pendulum bob can partly or wholly include the transmitter device. In this way, the weight and volume of the transmitter device is simultaneously used for the orientation of the self-orienting pendulum device, which saves constructive space and weight.

When the engine is at a standstill, the self-orienting pendulum device rotates automatically into a position determined by gravity. This position determined by gravity can for example define, at least partially, a surrounding system of the motor vehicle. However, this surrounding system need not agree with the vehicle coordinate system, because for example the motor vehicle may come to a standstill in an oblique position. For example, the motor vehicle may be parked on a sloping street.

Correspondingly, the shaft angle sensor system can be further developed according to the present invention in such a way that in addition an inclination angle recognition system is provided.

Inclination angle recognition systems of this sort are conventional. For example, such systems can, again, operate with corresponding pendulum devices. Using the additional inclination angle recognition system, according to the present invention the at least one angle signal that was generated after the internal combustion engine came to a standstill can be corrected with respect to the inclination of the motor vehicle coordinate system. In this way, the surrounding system and the motor vehicle coordinate system can be calibrated to one another, whereby in turn the precise angular position of the shaft can be calculated.

The wireless exchange of data between the transmitter device and the base station can in particular take place in that the base station and the transmitter device have corresponding electromagnetic oscillator circuits for the emission or reception of electromagnetic waves. Such systems can have an extremely small constructive volume, as is conventional in, for example, transponder technology. In particular, in many cases only very small, for example printed, circuits are required for data exchange, for example in the form of antenna spirals printed on a substrate and corresponding additional elements.

The exchange of electromagnetic waves can take place between the transmitter device and the base station unidirectionally or bidirectionally. In particular, a first signal of the base station can excite the transmitter device to transmit a measurement signal. In this way, for example, the decision whether an engine standstill is present can be "outsourced" to the base station or to a device connected to the base station. In particular, an engine control device can be incorporated into the shaft angle sensor system.

The construction of the base station and the transmitter device can, for example, be analogous to that of conventional tire pressure monitoring systems. Such systems are described for example in German Patent Application No. DE 10 2004 019 858 A1. In particular, the shaft angle sensor system can also be constructed in such a way that the transmitter device is not equipped with its own energy supply, or is equipped only with a small (e.g. emergency) energy supply. Correspondingly, electromagnetic energy for the operation of the sensor can be transmitted wirelessly from the base station to the at least one transmitter device via electromagnetic waves. There, for example this electromagnetic energy can be used to charge a capacitor or a similar energy storage device that ensures the supply of energy for the transmission process and/or the magnetic field measurement.

In comparison with conventional systems, the shaft angle sensor according to the present invention and the shaft angle sensor system according to the present invention have numerous advantages. In particular, a compact system that is not liable to failure is provided that enables an absolute angle measurement of a shaft angle. Correspondingly, upon startup the engine position, defined for example by an angular position of the crankshaft and/or camshaft, is known. These position data can be used by an engine control device to optimize the engine controlling process. Correspondingly, the system according to the present invention can greatly reduce pollutant emissions in comparison with conventional systems, in particular when starting the internal combustion engine.

Besides an angle recognition during starting, the described shaft angle sensor can of course also be used to determine rotational speed during operation of the internal combustion engine. An additional system, for example using the above-described encoder wheels, is not required.

The wireless signal transmission according to the present invention between the transmitter device and the base station enables a significant savings of constructive space. In particular, a plug connection to the housing is no longer required, which in the conventional systems often takes up a large amount of space, and until now has largely prevented the use of such magnet sensors.

The fact that according to the present invention an internal energy supply, or energy supply via corresponding cables, can also be done away with saves additional constructive space. Alternatively, or in addition, however, a separate energy storage unit (for example, an accumulator or a battery) can also be provided inside the sensor housing. Via a relative movement of the self-orienting pendulum device, for example, relative to the housing or to another reference point (for example a reference point connected to the vehicle body), an energy supply could be realized for example by inducing a voltage. For example, this induced voltage could be used to charge an accumulator. Overall, it is to be noted that the development according to the present invention, in which an angle signal is transmitted only once during a standstill state, has a particularly low energy requirement.

BRIEF DESCRIPTION OF THE DRAWING

The present invention is explained below on the basis of the figure.

DETAILED DESCRIPTION OF EXAMPLE EMBODIMENTS

Figure 1:
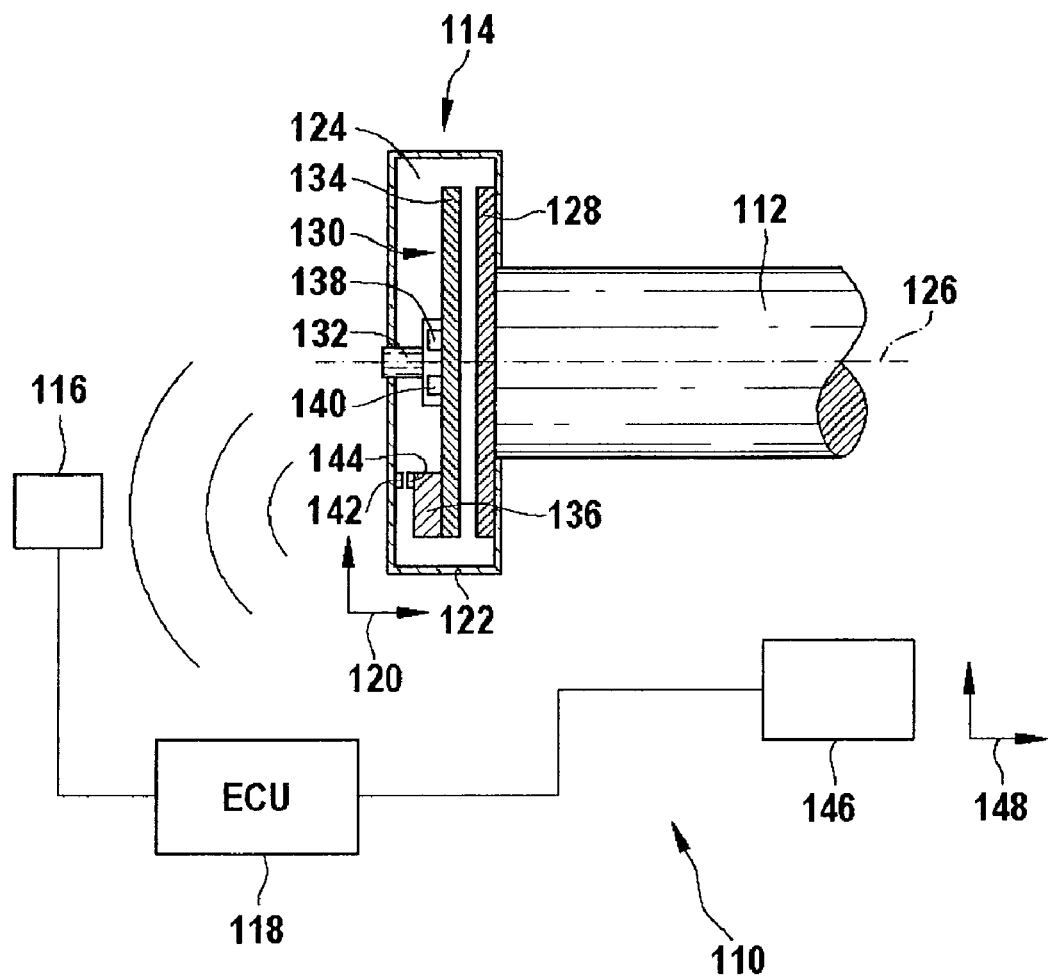
FIG. 1 shows an exemplary embodiment of a shaft angle sensor system according to the present invention for determining an angular position of a crankshaft.

FIG. 1 shows a preferred exemplary embodiment of a shaft angle sensor system 110 according to the present invention for acquiring an angular position of a crankshaft 112. Shaft angle sensor system 110 generally has three units: a preferred construction of a shaft angle sensor 114 according to the present invention (hereinafter designated "sensor unit"), a base station 116, and an engine control device (engine control unit, or ECU) 118. Sensor unit 114 has a housing 122 that is situated for example on crankshaft 112. Housing 122 has an interior space 124 that is hermetically sealed by housing 122 against the penetration of dirt and moisture.

FIG. 1 also symbolically shows a vehicle coordinate system 120. In this vehicle coordinate system 120, crankshaft 112 rotates about a crankshaft axis 126. At its end facing sensor unit 114, crankshaft 112 is connected fixedly to a magnetic dipole disk 128. When crankshaft 112 rotates about its crankshaft axis 126, this magnetic dipole disk 128 also rotates about crankshaft axis 126. Correspondingly, the magnetic field produced by magnetic dipole disk 128 also rotates. Magnetic dipole disk 128 is housed in the interior space 124 of housing 122, this housing taking place in such a way that the transition between housing 122 and crankshaft 112 is sealed in order to prevent penetration of dirt and moisture.

In addition, a self-orienting pendulum device 130 is housed in the interior space 124 of housing 122. Self-orienting pendulum device 130 is connected to housing 122 by a pendulum axle 132, but is mounted so as to be capable of rotation relative to housing 122. Here, pendulum axle 132 is oriented parallel to crankshaft axis 126, so that a rotation of self-orienting pendulum device 130 parallel to the rotation of crankshaft 112 can take place.

Self-orienting pendulum device 130 has a magnetic sensor element 134 and a transmitter device 136. In this exemplary embodiment, the magnetic sensor element is constructed as an AMR sensor, and also has an evaluation electronics unit 138 that is mounted near pendulum axle 132. Magnetic sensor element 134 is constructed so as to measure, via the AMR effect, an orientation of the magnetic field generated by magnetic dipole disk 128, and thus an angular position of crankshaft 112 relative to magnetic sensor element 134.

In addition, self-orienting pendulum device 130 has a standstill recognition system 140. Using magnetic sensor element 134 and evaluation electronics unit 138, this standstill recognition system 140 compares determined angular positions of magnetic dipole disk 128 at fixedly determined or variably determined points in time. If standstill recognition system 140 recognizes that these angular positions do not differ at adjacent points in time, it is automatically inferred that the internal combustion engine is at a standstill.

Evaluation electronics unit 138 and standstill recognition system 140 are connected to transmitter device 136. Transmitter device 136 has an electromagnetic oscillator circuit as well as a capacitor that acts as an electrical energy storage device.

In addition, shaft angle sensor system 110 has a base station 116 that is in turn connected to engine control device 118. For example, base station 116 is housed at a location in the motor vehicle from which electromagnetic waves are transmitted in undisturbed fashion to transmitter device 136, and can be received by this device. Correspondingly, base station 116 is preferably housed spatially close to sensor unit 114 in the motor vehicle. Simultaneously, base station 116 can be housed in a location in the motor vehicle at which base station 116 is not subjected to a high thermal loading by the internal combustion engine. Correspondingly, more sensitive electronics can be housed in particular in base station 116 than in sensor unit 114.

In this exemplary embodiment, the exchange of electromagnetic waves takes place bidirectionally between base station 116 and transmitter device 136. In particular, transmitter device 136 is preferably charged with electromagnetic waves at regular intervals by base station 116, and the electromagnetic energy of these waves can be stored in the described capacitor of transmitter device 136. In this way, a supply of energy to sensor unit 114 in regular fashion is ensured. Simultaneously, for example base station 116 can also induce sensor unit 114 to carry out a corresponding measurement of the angular position of crankshaft 112 and/or to communicate corresponding data.

In addition, sensor unit 114 has a permanent magnet 142 that is fixedly connected to housing 122. As a counterpiece to permanent magnet 142, an induction coil 144 is fastened to self-orienting pendulum device 130 in the area of transmitter device 136. When self-orienting pendulum device 130 moves about its pendulum axle 132, a current is induced in induction coil 144 by permanent magnet 142. This current can be used to charge an electrical energy storage device in self-orienting pendulum device 130, for example the capacitor already described above or an additional accumulator, with electrical energy.

In addition, in this exemplary embodiment according to FIG. 1 shaft angle sensor system 110 has an additional inclination angle recognition system 146. This inclination angle recognition system recognizes the inclination of the motor vehicle, in particular the inclination of motor vehicle coordinate system 120, relative to a surrounding system 148 (shown symbolically in FIG. 1). Inclination angle recognition system 146 can for example in turn be based on conventional designs, such as for example pendulum designs, and can also be used in other ways in the motor vehicle, for example in order to adjust a suspension of the motor vehicle to the inclination of the motor vehicle relative to its surroundings.

Because when the motor vehicle is at a standstill, self-orienting pendulum device 130 will adjust itself relative to surrounding system 148 based on the force of gravity acting on self-orienting pendulum device 130, and will not, in contrast, adjust itself relative to motor vehicle coordinate system 120, the angle signal transmitted by sensor unit 114 concerning the angular position of crankshaft 112 can correspondingly be converted (for example in engine control unit 118) into an angle signal relative to motor vehicle coordinate system 120. This signal relative to motor vehicle coordinate system 120 is required as information during the starting of the internal combustion engine.

What is claimed is:

1. A shaft angle sensor for acquiring an angular position of a shaft of an internal combustion engine of a motor vehicle, the shaft being one of a crankshaft or a camshaft, the sensor comprising:
   a magnetic transducer element; and
   a magnetic sensor element, one of the magnetic transducer element or the magnetic sensor element being capable of being connected fixedly to the shaft, the magnetic sensor element producing at least one angle signal,
   wherein:
      the at least one angle signal is capable of being transmitted wirelessly to a base station by a transmitter device, and
      the other of the magnetic sensor element and the magnetic transducer element that is not provided for connection to the shaft is connected to a self-orienting pendulum device, the self-orienting pendulum device being mounted so as to be capable of rotation about an axle parallel to a shaft axis.

2. The shaft angle sensor as recited in claim 1, wherein the self-orienting pendulum device has a pendulum bob, the pendulum bob including the transmitter device.

3. The shaft angle sensor as recited in claim 1, wherein the magnetic sensor element includes at least one of a Hall sensor, a GMR sensor, and an AMR sensor.

4. A shaft angle sensor for acquiring an angular position of a shaft of an internal combustion engine of a motor vehicle, the shaft being one of a crankshaft or a camshaft, the sensor comprising:
   a magnetic transducer element;
   a magnetic sensor element, one of the magnetic transducer element or the magnetic sensor element being capable of being connected fixedly to the shaft, the magnetic sensor element producing at least one angle signal,
   wherein the at least one angle signal is capable of being transmitted wirelessly to a base station by a transmitter device; and
   an induction device, an electrical energy being produced by the induction device through a relative movement of a self-orienting pendulum device relative to a housing, and this electrical energy being stored in an electrical energy storage device.

5. The shaft angle sensor as recited in claim 4, wherein the magnetic sensor element includes at least one of a Hall sensor, a GMR sensor, and an AMR sensor.

6. A shaft angle sensor system, comprising:
   a shaft angle sensor;
   a magnetic transducer element;
   a magnetic sensor element, one of the magnetic transducer element or the magnetic sensor element being capable of being connected fixedly to the shaft, the magnetic sensor element producing at least one angle signal,
   wherein the at least one angle signal is capable of being transmitted wirelessly to a base station by a transmitter device;
   at least one base station; and
   a standstill recognition system, the standstill recognition system recognizing a standstill of the internal combustion engine, and the shaft angle sensor being fashioned so as to transmit the at least one angle signal from the shaft angle sensor to the base station when a standstill is recognized,
   wherein the shaft angle sensor is fashioned so as to transmit the at least one angle signal to the base station only when a standstill is recognized.

7. The shaft angle sensor system as recited in claim 6, wherein the shaft angle sensor is designed to transmit exactly one angle signal.

8. A shaft angle sensor system, comprising:
   a shaft angle sensor;
   a magnetic transducer element;
   a magnetic sensor element, one of the magnetic transducer element or the magnetic sensor element being capable of being connected fixedly to the shaft, the magnetic sensor element producing at least one angle signal,
   wherein the at least one angle signal is capable of being transmitted wirelessly to a base station by a transmitter device;
   at least one base station; and
   a standstill recognition system, the standstill recognition system recognizing a standstill of the internal combustion engine, and the shaft angle sensor being fashioned so as to transmit the at least one angle signal from the shaft angle sensor to the base station when a standstill is recognized,
   wherein the standstill recognition system acquires angle signals at predetermined temporal intervals, and recognizes a standstill when the angle signals differ by not more than a predetermined tolerance angle.

9. The shaft angle sensor system as recited in claim 8, wherein the shaft angle sensor is designed to transmit exactly one angle signal.

10. A shaft angle sensor system, comprising:
    a shaft angle sensor;
    a magnetic transducer element;
    a magnetic sensor element, one of the magnetic transducer element or the magnetic sensor element being capable of being connected fixedly to the shaft, the magnetic sensor element producing at least one angle signal,
    wherein the at least one angle signal is capable of being transmitted wirelessly to a base station by a transmitter device;
    at least one base station; and
    an inclination angle recognition system, the inclination angle recognition system recognizing an inclination of the motor vehicle coordinate system relative to a surrounding system when the motor vehicle is at a standstill, and correcting the at least one angle signal with respect to the inclination of the motor vehicle coordinate system.

11. The shaft angle sensor system as recited in claim 10, wherein the shaft angle sensor is designed to transmit exactly one angle signal.

12. A shaft angle sensor system, comprising:
    a shaft angle sensor;
    a magnetic transducer element;
    a magnetic sensor element, one of the magnetic transducer element or the magnetic sensor element being capable of being connected fixedly to the shaft, the magnetic sensor element producing at least one angle signal,
    wherein the at least one angle signal is capable of being transmitted wirelessly to a base station by a transmitter device; and
    at least one base station,
    wherein the transmitter device is supplied with energy wirelessly by at least one of the base station and a supply station.

13. The shaft angle sensor system as recited in claim 12, wherein the shaft angle sensor is designed to transmit exactly one angle signal.

* * * * *